US012613099B2

(12) United States Patent
Bodenheimer et al.

(10) Patent No.: US 12,613,099 B2
(45) Date of Patent: Apr. 28, 2026

(54) METHOD FOR CHECKING WHETHER A SWITCH OF A DRIVING MODE CAN BE SAFELY CARRIED OUT

(71) Applicant: Continental Teves AG & Co. OHG, Frankfurt am Main (DE)

(72) Inventors: Robert Bodenheimer, Nuremberg (DE); Bernd Kubina, Nuremberg (DE); Roland Burghardt, Nuremberg (DE)

(73) Assignee: CONTINENTAL AUTOMOTIVE TECHNOLOGIES GMBH, Hanover (DE)

( * ) Notice: Subject to any disclaimer, the term of this patent is extended or adjusted under 35 U.S.C. 154(b) by 166 days.

(21) Appl. No.: 17/056,251

(22) PCT Filed: May 20, 2019

(86) PCT No.: PCT/EP2019/062913
§ 371 (c)(1),
(2) Date: Nov. 17, 2020

(87) PCT Pub. No.: WO2019/228835
PCT Pub. Date: Dec. 5, 2019

(65) Prior Publication Data
US 2021/0294321 A1 Sep. 23, 2021

(30) Foreign Application Priority Data
May 30, 2018 (DE) ..................... 10 2018 208 593.5

(51) Int. Cl.
*G01C 21/30* (2006.01)
*B60W 60/00* (2020.01)
(Continued)

(52) U.S. Cl.
CPC ........... *G01C 21/30* (2013.01); *B60W 60/005* (2020.02); *G05D 1/0061* (2013.01);
(Continued)

(58) Field of Classification Search
CPC .............. G05D 1/0061; B60W 60/005; B60W 2556/10; G06V 20/588; G01C 21/30; G06K 9/6268
See application file for complete search history.

(56) References Cited

U.S. PATENT DOCUMENTS

| | | |
|---|---|---|
| 6,560,529 B1 | 5/2003 | Janssen |
| 10,479,362 B2 | 11/2019 | Goto et al. |

(Continued)

FOREIGN PATENT DOCUMENTS

| | | |
|---|---|---|
| CN | 107430807 A | 12/2017 |
| DE | 19842176 A1 | 3/2000 |

(Continued)

OTHER PUBLICATIONS

German Search Report for German Application No. 10 2018 208 593.5, daled Nov. 4, 2019 with partial translation, 9 pages.
(Continued)

*Primary Examiner* — Toya Pettiegrew
(74) *Attorney, Agent, or Firm* — Buchanan Ingersoll & Rooney.P.C.

(57) ABSTRACT

A method for operating a vehicle, wherein a check is carried out to determine whether a switch of the driving mode can be safely carried out and a corresponding output is provided, wherein an estimation is made as to whether the road class traversed by the vehicle corresponds to a target road class, including the steps of: ascertaining the position of the vehicle using a satellite navigation system, comparing the ascertained position with a road map, wherein the road map includes an allocation of roads according to road classes, and determining whether a road of the target road class is located in a specified area around the ascertained position on the road map.

9 Claims, 1 Drawing Sheet

(51) Int. Cl.
   *G05D 1/00* (2024.01)
   *G06F 18/241* (2023.01)
   *G06V 20/56* (2022.01)

(52) U.S. Cl.
   CPC .......... *G06F 18/241* (2023.01); *G06V 20/588*
      (2022.01); *B60W 2420/403* (2013.01); *B60W*
      *2420/408* (2024.01); *B60W 2420/54* (2013.01);
      *B60W 2530/18* (2013.01); *B60W 2552/50*
      (2020.02); *B60W 2552/53* (2020.02); *B60W*
      *2555/60* (2020.02); *B60W 2556/10* (2020.02);
      *B60W 2556/50* (2020.02); *B60W 2556/65*
      (2020.02)

(56) References Cited

U.S. PATENT DOCUMENTS

| | | | | |
|---|---|---|---|---|
| 2009/0018765 | A1* | 1/2009 | Kim | G08G 1/096811 |
| | | | | 701/423 |
| 2010/0169013 | A1* | 7/2010 | Nakamura | G08G 1/0969 |
| | | | | 701/469 |
| 2015/0260614 | A1* | 9/2015 | Forslof | G08G 1/0133 |
| | | | | 702/182 |
| 2017/0054842 | A1* | 2/2017 | Choi | H04W 4/021 |
| 2017/0059339 | A1* | 3/2017 | Sugawara | G01C 21/3484 |
| 2018/0004223 | A1 | 1/2018 | Baldwin | |
| 2018/0065549 | A1* | 3/2018 | Watanabe | B60Q 9/00 |
| 2018/0107216 | A1* | 4/2018 | Beaurepaire | G06Q 30/0261 |
| 2019/0025825 | A1* | 1/2019 | Takahama | B60W 30/16 |
| 2019/0051172 | A1* | 2/2019 | Stenneth | G08G 1/163 |
| 2019/0187722 | A1* | 6/2019 | Hu | G05D 1/0212 |
| 2019/0362162 | A1* | 11/2019 | Averbuch | G01C 21/3815 |
| 2021/0016789 | A1* | 1/2021 | Limbacher | B60W 50/14 |
| 2021/0064057 | A1* | 3/2021 | Eldar | G06V 20/56 |

FOREIGN PATENT DOCUMENTS

| | | |
|---|---|---|
| DE | 102013217871 A1 | 3/2015 |
| DE | 102015205131 A1 | 9/2016 |
| DE | 102016212146 A1 | 1/2018 |
| EP | 2940545 A1 | 11/2015 |

OTHER PUBLICATIONS

International Search Report and Written Opinion for International Application No. PCT/EP2019/062913, dated Sep. 16, 2019. 8 pages.
International Search Report and Written Opinion for International Application No. PCT/EP2019/062913, dated Sep. 16, 2019, 15 pages (German).
Wachenfeld et al., "Use-Cases Des Autonomen Fahrens", Berlin Heidelberg, 2015, pp. 9-14, downloaded from the internet at https://link.springer.com/chapter/10.1007/978-3-662-45854-9-2.
Chinese Office Action for Chinese Application No. 201980036304.4, dated Apr. 1, 2023 with translation, 19 pages.
Chinese Office Action for Chinese Application No. 201980036304.4, dated Sep. 13, 2023 with translation, 14 pages.
Chinese Notice of Allowance for Chinese Application No. 201980036304.4, dated Nov. 29, 2023 with translation, 7 pages.
Yokoo et al., "Damping Control of Induction Motor Traction System in Single-Pulse Mode of Field Weakening Region," 2015 International Conference on Electrical Systems for Aircraft, Railway, Ship Propulsion and Road Vehicles (ESARS), May 7, 2015, 6 pages.

* cited by examiner

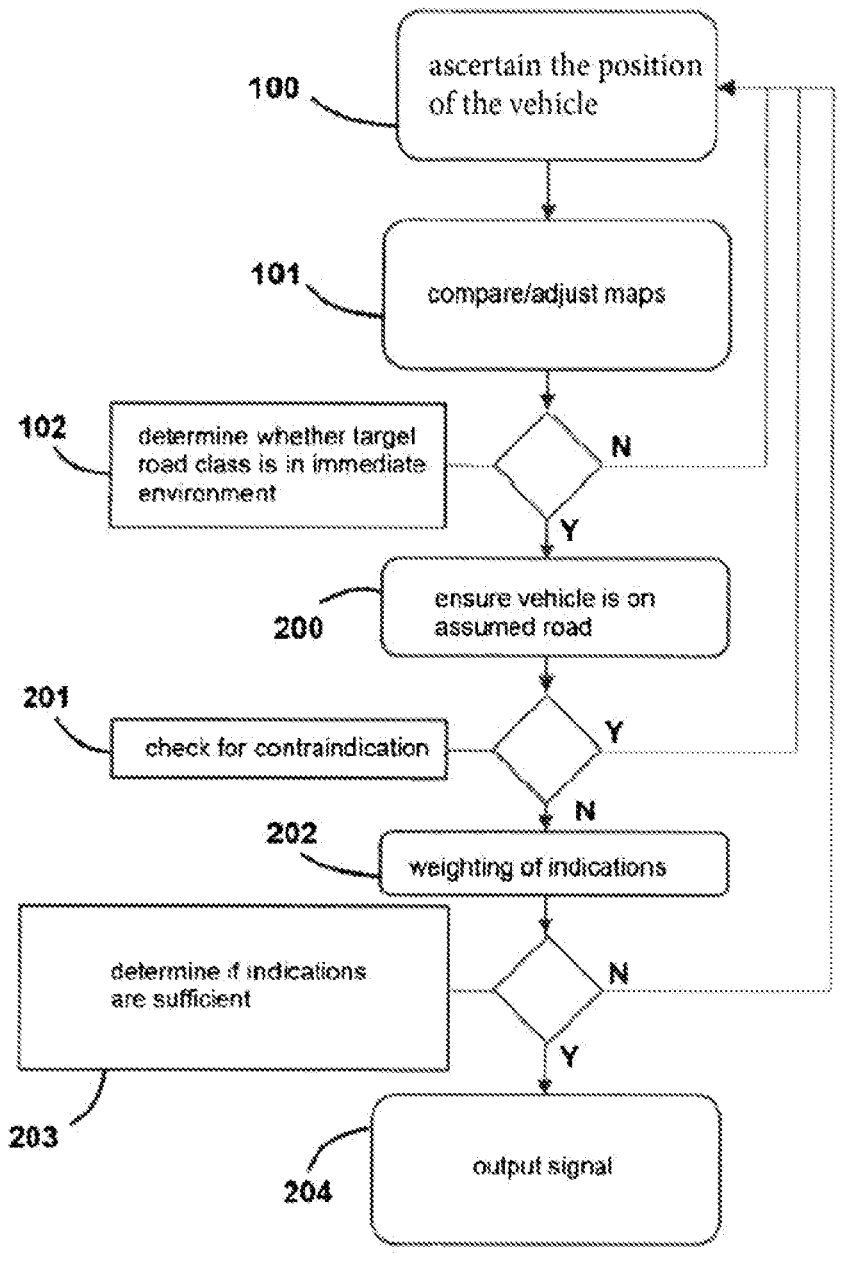

METHOD FOR CHECKING WHETHER A SWITCH OF A DRIVING MODE CAN BE SAFELY CARRIED OUT

CROSS REFERENCE TO RELATED APPLICATIONS

This application is the U.S. National Phase Application of PCT International Application No. PCT/EP2019/062913, filed May 20, 2019, which claims priority to German Patent Application No. 10 2018 208 593.5, filed May 30, 2018, the contents of such applications being incorporated by reference herein.

FIELD OF THE INVENTION

The invention relates to a method for operating a vehicle, a control device for performing the method, and a vehicle having the control device.

BACKGROUND OF THE INVENTION

In the case of vehicles which are able to switch from a driver-controlled or partially driver-controlled driving mode to a fully autonomous driving mode, it should be borne in mind that said transfer from human to the driving computer must not lead to safety-critical situations, for example because the road currently being traversed is not suitable or at least not permitted for the autonomous driving mode or because the present situation on the road is not suitable for the initialization of the autonomous driving mode. Unlike the transfer in the reverse direction, from the driving computer to the human, only a few approaches to this transfer are known.

In order to ensure that no safety-critical situations occur, it would be helpful to be able to carry out a reliable localization of the vehicle, however conventional satellite navigation is not sufficiently precise and safe for this, particularly not within the meaning of a corresponding ASIL classification.

SUMMARY OF THE INVENTION

Therefore, an aspect of the invention is a method for operating a vehicle, which carries out a check to determine whether a switch of the driving mode can be safely carried out. According to an aspect of the invention, a check is carried out during a method for operating a vehicle to determine whether a switch of the driving mode can be safely carried out, wherein an estimation is made as to whether the road class traversed by the vehicle corresponds to a target road class, comprising the steps of:

ascertaining the position of the vehicle using a satellite navigation system, comparing the ascertained position with a road map, wherein the road map comprises an allocation of roads according to road classes, and determining whether a road of the target road class is located in a specified area around the ascertained position on the road map.

The driving modes are preferably at least an autonomous and a driver-controlled driving mode, between which it is possible to switch.

The determination of the position of a vehicle with the aid of a satellite navigation system is generally only available with a certain uncertainty and inaccuracy. The method according to an aspect of the invention increases the safety during the check to determine whether a switch to a driving mode which necessarily requires a specific target road class can be safely carried out. This is effected in that it can at least be established whether a road of the target road class is located in a specified area around the ascertained position on the road map, so that at least serious misinformation regarding the position determined using the satellite navigation system can be compensated for.

The term "road classes" preferably categorizes roads or routes that can be traversed, which are distinguished under traffic law, structurally, due to their course, or due to the maximum allowed speed. However, the term "road classes" also preferably comprises, for example, a distinction of roads due to temporary or permanent special features such as, for example, congestion, accidents and/or construction sites. Accordingly, various road classes can preferably permit, for example, a distinction between highways, highways having congestion or stop-go traffic, highways having many or few danger spots or construction sites, country roads, country roads having a risk of wild animals crossing, urban roads and urban roads having potholes, although it must be understood that this list merely serves as an example. Specific sections of a road or entire geographical regions or the exclusion of one or more specific regions can also be defined under a specific road class. In other words, the term "road classes" can also be understood to mean that the distinction of the road classes has multiple subdivision levels, wherein a coarse subdivision distinguishes, for example, between highways, country roads and urban roads and, in each case, a more precise subdivision in accordance with temporary or permanent special features is possible, in order to define a specific road class. The road map used preferably comprises merely a coarse subdivision. The target road class is accordingly a road class which is suitable for a changeover of the driving mode to be carried out. For example, it could be sensible to not allow a switch from a manual to an autonomous driving mode to be carried out or to exclude said switch in the region of a construction site, for safety reasons. The term "target road class" covers the possibility that the target road class covers a group of possible road classes.

Comparing the ascertained position with a road map is preferably understood to mean that the data determined using satellite navigation are used in order to determine coordinates, if necessary additionally indicating the direction of movement, on a road map, and to transfer the ascertained position or direction of movement of the vehicle to the road map. The road map is preferably a virtual, preferably digitally saved, map, in which at least roads but, if necessary, also buildings or other environment of the roads are recorded, wherein a road class is assigned to at least a part of the recorded roads. If no road of the target road class is located in the specified area around the ascertained position of the vehicle on the road map, a changeover of the driving mode is preferably blocked.

It is preferred that, in addition to the position of the vehicle, the direction of movement of the vehicle is ascertained using the satellite navigation system and is compared with the road map. The direction of movement and speed can be ascertained over time in the case of the satellite navigation, for example by means of the Doppler effect or the alteration in the ascertained position. In addition to the position, the direction of movement provides increased information security during the check to determine whether a switch of the driving mode can be safely carried out.

It is preferred that, in the event that a road of the target road class is located in the specified area around the ascertained position on the road map, a check is carried out on the basis of the vehicle environment to determine whether an indication or a group of multiple indications regarding the road class traversed by the vehicle exist(s). Consequently, the safety can be significantly increased during the decision regarding a switch of the driving mode. The check to determine whether a road of the target road class is located in a specified area around the ascertained position on the road map only provides a first hint; the check of further indications however ensures that the vehicle is actually located on this road. This is, for example, possible by utilizing the recognition of the environment of the vehicle by sensors in order to check confirmations of the characteristics or contradictions to the characteristics of the theoretically or exemplarily defined target road class in reality.

The indications are preferably distinguished according to whether they refute or confirm that the road class traversed by the vehicle corresponds to the target road class, wherein in the event of one or more refuting indications, an output is provided that a switch of the driving mode cannot be safely carried out. One refuting indication is particularly preferably sufficient for the output that a switch of the driving mode cannot be safely carried out. Consequently, a particularly high safety is attained.

In accordance with a preferred embodiment, the indications are weighted, in particular with a weighting factor, according to how meaningful they are regarding the road class traversed by the vehicle and/or how reliably it can be refuted or confirmed by the respective indication that the road class traversed by the vehicle corresponds to the target road class. The weighting can preferably be carried out depending on the current target road class. The different significance of various indications is, consequently, taken into account. For example, an indication which consists of a junction or a stop line being recognized relatively clearly contradicts a target road class envisaging a highway, which is why such an indication should be given a high weighting.

If a special infrastructure or a road sign which explicitly allows a specific driving mode, for example automated driving, is recognized as an indication, this one indication can preferably be considered a sufficient criterion and a transfer of the driving function to the vehicle can be allowed independently of further indications. This primarily applies if the system is, in principle, completely in control of all of the allowed road classes and all of the situations which occur there, such as congestion, construction sites, poor visibility or similar. Otherwise, it is recommended that multiple indications be enlisted.

It is preferred that it is ascertained, on the basis of the entirety of the weighted indications, in particular on the basis of the total of the weighting factors, whether a switch of the driving mode can be safely carried out or not, wherein the corresponding output, in particular in the form of an electrical signal, is provided dependent thereon.

It is preferred that the existence of the one indication or the group of indications is checked using one or more sensors for recognizing objects, in particular camera, lidar, radar and ultrasonic sensors. Since such sensors are usually present anyway, in particular in the case of autonomous vehicles, the method can consequently be realized, without additional expenditure or additional costs.

The indication or the group of indications preferably comprise(s) one or more of the following:

recognition of the structural separation between lanes or roads, recognition of the form, size, color and/or the distances of the lane marking, recognition of the form, size, color and/or the distance of the lane edges, in particular the guardrail and/or the reflector posts, recognition of the signage, in particular the color, form, size of the traffic sign and/or of the semantic content of the inscription, recognition of the direction of travel of the traffic in the environment of the vehicle, information obtained from vehicle-to-vehicle communication, reference marks of the road and/or of the road environment, recognition of signage regarding autonomous driving, recognition of infrastructure, in particular toll gantries, toll stations, border checkpoints, recognition of a speed limit on a traffic sign, history of the distance traveled, wherein the distance traveled is extracted from an electronic memory.

It corresponds to a preferred embodiment that the time at which an indication exists is in each case saved, wherein, depending on the type of indication, a specific validity period is assigned to the indication.

It is preferred that the existence of the indication is not evaluated positively for one or more indications until the indication has been recognized multiple times. As a result of repeated observation, the information security is consequently increased for this respective indication before it is determined that the indication exists and is therefore used in the method for checking to determine whether a switch of the driving mode can be safely carried out.

It is preferred that, as a consequence of the output that a switch of the driving mode can be safely carried out, the vehicle switches to a driving mode having an increased degree of automation of the vehicle control, in particular to a fully automated driving mode, or the vehicle, if it is already in the driving mode having an increased degree of automation of the vehicle control, retains the latter. The method can accordingly be applied in a driving mode, in which a human driver controls the vehicle, if a switch to an automated driving mode is striven for. The method can, however, also be applied in an automated driving mode, wherein a check is carried out to determine whether the automated driving mode can be safely retained.

According to a further aspect of the invention, a control device is designed to perform the method described above in accordance with one or more embodiments.

A further aspect of the invention provides a vehicle, the vehicle control of which has multiple driving modes having different degrees of automation, between which it is possible to switch, comprising the said control device.

BRIEF DESCRIPTION OF THE DRAWINGS

The characteristics, features and advantages of aspects of the invention described above as well as the way in which these are achieved will become clearer and easier to understand in connection with the drawing which is explained below.

The FIGURE shows a flow chart of an embodiment of the method according to an aspect of the invention.

DETAILED DESCRIPTION OF THE PREFERRED EMBODIMENTS

Referring to the FIGURE, in a first step 100, the position of the vehicle is first determined in the known manner using satellite navigation, if necessary with the assistance of vehicle dynamic sensors, for example an IMU as well as vehicle odometry, wherein during the determination of the position, a safeguarding or tolerance radius, for example twenty meters, is taken account of. In addition, the direction of movement of the vehicle is also determined.

In the subsequent step 101, a comparison of maps or an adjustment of maps is carried out. The position and direction information of the vehicle obtained using satellites is compared with the location information of a stored digital road map. The map has a sufficiently high and safeguarded accuracy.

In a further step 102, a check is carried out to determine whether a road having a sought road class, the target road class, is located in the immediate environment of the vehicle on the road map, wherein the target road class comprises the types of roads which are permitted for a switch to the autonomous driving mode. If no target road class is present in the area, for example with a radius of two hundred meters, the process continues with step 100. If, on the other hand, such a target road class is present, the method is continued with step 200.

It is ensured with step 200 that the vehicle is actually located on the assumed road. To this end, further pieces of information from the environment of the vehicle are used as indications, for example lane markings or traffic signs.

In step 201, a check is carried out to determine whether a contraindication has been found. This can exist, for example, in the form of structural criteria or signage. Even if the road class which has been coarsely determined with the road map applies, it may be that a construction site is recognized and classified as a contraindication. If such a contraindication exists, no autonomous driving mode is allowed and the method begins again at step 100.

If, on the other hand, no contraindication is found, a weighting of the further indications is carried out, according to how meaningful they are regarding the road class traversed by the vehicle or how reliably it can be refuted or confirmed by the respective indication that the road class traversed by the vehicle corresponds to the target road class, with step 202, in order to further increase the safety.

If, subsequently, the result of step 203 is that the recognized and weighted indications in their entirety are not sufficient in order to safely identify the road class, the method starts again at step 100. Otherwise, a corresponding signal is output at step 204, which signals that a switch of the driving mode, that is to say a transition of the vehicle control from the human driver to the vehicle, is permissible.

The invention claimed is:

1. A method for operating a vehicle, wherein a check is carried out to determine whether a switch of a driving mode can be safely carried out and a corresponding output is provided, wherein an estimation is made as to whether the road class traversed by the vehicle corresponds to a target road class, comprising a control device adapted to perform:

ascertaining the position of the vehicle using a satellite navigation system;

comparing the ascertained position of the vehicle with a road map, wherein the road map comprises an allocation of roads according to road classes;

determining whether a road of the target road class is located within a predetermined radius of the ascertained position of the vehicle on the road map, wherein the target road class comprises one of a highway, a highway having congestion or stop-go traffic, a highway having danger spots or construction sites, a country road, a country road having a risk of wild animals crossing, an urban road, or an urban roads having potholes;

weighting, with weighting factors, indications regarding the road class traversed by the vehicle to refute or confirm by the indications that the road class traversed by the vehicle corresponds to the target road class, wherein the indications refuting that the road class traversed by the vehicle corresponds to the target road class comprise an infrastructure, a road structure, a road marking, or a road sign;

distinguishing the indications according to whether the indications refute or confirm that the road class traversed by the vehicle corresponds to the target road class, wherein in the event of one or more indications refuting that the road class traversed by the vehicle corresponds to the target road class, an output is provided that a switch of the driving mode cannot be safely carried out;

switching the driving mode of the vehicle to a driving mode having a different degree of automation from that of the current driving mode based on a result of the determining whether the road of the target road class is located within the predetermined radius of the ascertained position of the vehicle on the road map and based on the weighting, with the weighting factors, of the indications regarding the road class traversed by the vehicle, wherein it is ascertained based on an entirety of the weighted indications and based on a total of the weighting factors, whether the switch of the driving mode can be safely carried out, and wherein the driving mode having the different degree of automation comprises a driver-controlled driving mode, a partially driver-controlled driving mode, or a fully autonomous driving mode;

wherein in the event that a road of the target road class is located in the specified area around the ascertained position on the road map, a check is carried out on the basis of the vehicle environment to determine whether an indication or a group of multiple indications regarding the road class traversed by the vehicle exist(s), wherein the check is performed by one or more sensors of the vehicle; and wherein the existence of the indication is not evaluated positively for one or more indications until the indication has been recognized multiple times by the one or more sensors of the vehicle.

2. The method according to claim 1, wherein, in addition to the position of the vehicle, a direction of movement of the vehicle is ascertained using the satellite navigation system and is compared with the road map.

3. The method according to claim 1, wherein a corresponding output, in the form of an electrical signal, is provided dependent on a determination of whether a switch of the driving mode can be safely carried out or not.

4. The method according to claim 1, wherein the one or more sensors of the vehicle comprises at least one of a sensor for recognizing objects, a camera sensor, a lidar sensor, a radar sensor, or an ultrasonic sensor.

5. The method according to claim 1, wherein the indication or the group of indications comprise(s) one or more of the following:

recognition of the structural separation between lanes or roads, recognition of the form, size, color and/or the distances of the lane marking, recognition of the form, size, color and/or the distance of the lane edges, the guardrail and/or the reflector posts, recognition of the signage, the color, form, size of the traffic sign and/or of the semantic content of the inscription, recognition of the direction of travel of the traffic in the environment of the vehicle, information obtained from vehicle-to-vehicle communication, reference marks of the road and/or of the road environment, recognition of signage regarding autonomous driving, recognition of infrastructure, toll gantries, toll stations, border checkpoints, recognition of a speed limit on a traffic sign, history of the distance traveled, wherein the distance traveled is extracted from an electronic memory.

6. The method according to claim 1, wherein the time at which an indication exists is in each case saved, wherein, depending on the type of indication, a specific validity period is assigned to the indication.

7. The method according to claim 1, wherein as a consequence of the output that a switch of the driving mode can be safely carried out, the vehicle switches to a driving mode having an increased degree of automation of the vehicle control, to a fully automated driving mode, or the vehicle, if it is already in the driving mode having an increased degree of automation of the vehicle control, retains the latter.

8. A vehicle, the vehicle control of which has multiple driving modes having different degrees of automation, between which it is possible to switch, comprising the control device according to claim 1.

9. The method according to claim 1, wherein each of the indications is weighed, with a respective weighting factor of the weighting factors, according to how meaningful each of the indications is regarding the road class traversed by the vehicle and/or how reliably it can be refuted or confirmed by the respective indication that the road class traversed by the vehicle corresponds to the target road class.

* * * * *